(12) United States Patent
Quijano et al.

(10) Patent No.: US 7,537,258 B2
(45) Date of Patent: May 26, 2009

(54) MULTI-FUNCTIONAL FASTENER SYSTEM

(75) Inventors: Sherry L. Quijano, Grand Blanc, MI (US); Andrew J. Hanzel, Washington, MI (US); Joseph W. Cobble, III, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 488 days.

(21) Appl. No.: 11/358,734

(22) Filed: Feb. 21, 2006

(65) Prior Publication Data

US 2006/0186155 A1 Aug. 24, 2006

Related U.S. Application Data

(60) Provisional application No. 60/655,054, filed on Feb. 22, 2005.

(51) Int. Cl.
*B60R 7/00* (2006.01)
(52) U.S. Cl. ............... 296/37.8; 296/37.13; 211/86.01; 224/42.32
(58) Field of Classification Search .............. 296/37.13, 296/153, 37.7, 37.8, 37.12; 211/94, 88, 162, 211/86.01; 248/221.14, 200; 224/42.32, 224/42.33, 42.37, 42.38, 42.4
See application file for complete search history.

(56) References Cited

U.S. PATENT DOCUMENTS

| 1,149,541 | A | * | 8/1915 | Rees | 297/188.05 |
| 3,019,954 | A | * | 2/1962 | Faltin | 224/483 |
| 4,664,267 | A | * | 5/1987 | Clark | 211/94.01 |
| 4,869,378 | A | * | 9/1989 | Miller | 211/94.01 |
| 4,942,498 | A | * | 7/1990 | Toussaint | 361/709 |
| 5,180,089 | A | * | 1/1993 | Suman et al. | 224/547 |

* cited by examiner

*Primary Examiner*—Lori L Lyjak

(57) ABSTRACT

A fastening system for a vehicle body passenger compartment includes at least one fastening element mounted with respect to the vehicle body to be exposed within the passenger compartment, and at least one connector configured to support a convenience device, such as a cup holder, reading light, power source, cellular telephone charger, etc. The at least one connector is releasably connectable to the at least one fastening element to enable a vehicle user to alter or change which of several convenience devices is mounted within the passenger compartment. In a preferred embodiment, the at least one fastening element is sufficiently configured such that the at least one connector is connectable at multiple locations within the vehicle interior to enable a vehicle user to alter or adjust the physical location of a convenience device.

9 Claims, 3 Drawing Sheets

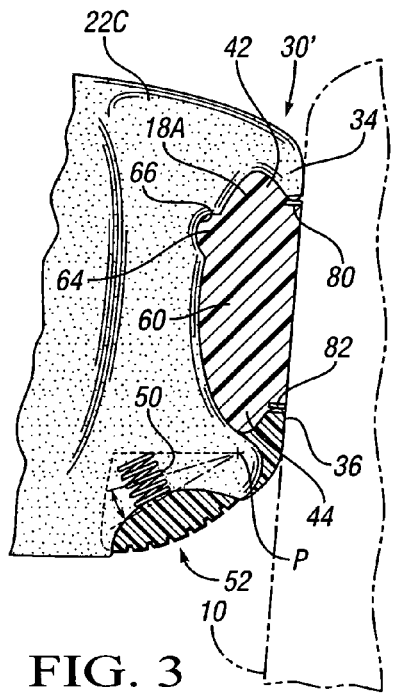
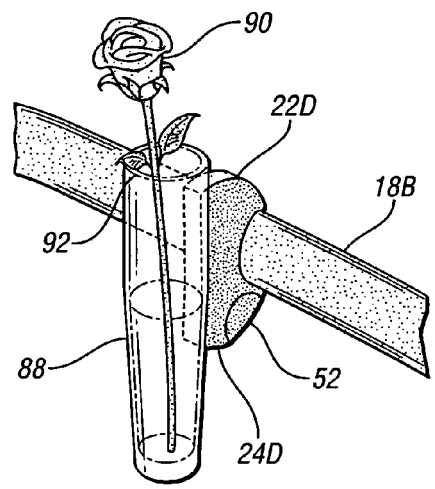
FIG. 3
FIG. 4
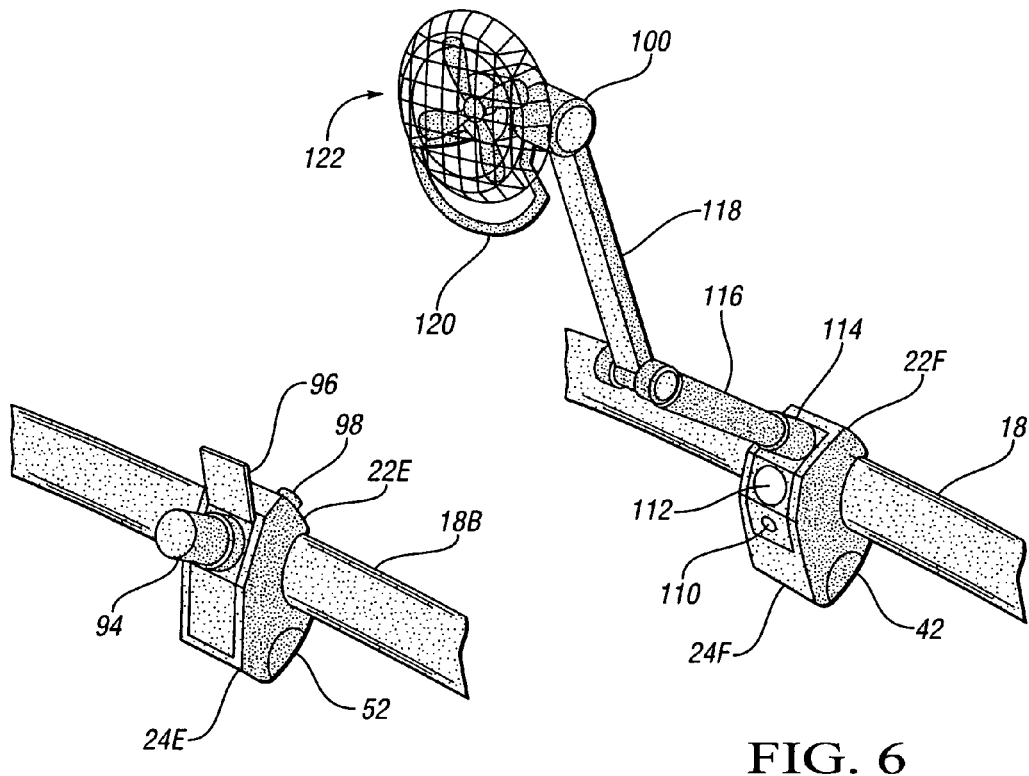
FIG. 5
FIG. 6

MULTI-FUNCTIONAL FASTENER SYSTEM

CROSS REFERENCE TO RELATED APPLICATION

This application claims the benefit of U.S. Provisional Patent Application No. 60/655,054, filed Feb. 22, 2005, and which is hereby incorporated by reference in its entirety.

TECHNICAL FIELD

This invention relates to vehicles having a fastening system whereby at least one convenience device is selectively, releasably securable at multiple locations in the vehicle passenger compartment.

BACKGROUND OF THE INVENTION

Passenger vehicles typically include convenience devices such as power outlets for aftermarket accessories such as cellular telephone chargers, light fixtures, and cup holders. These convenience devices are typically permanently affixed to the vehicle body at one location. For example, light fixtures are typically affixed to the headliner at the vehicle roof, or affixed to the driver' rear view mirror. Similarly, power outlets are typically affixed to the vehicle instrument panel. Cup holders are typically affixed to an instrument panel or center storage console between passenger seats.

SUMMARY OF THE INVENTION

A vehicle includes a vehicle body that defines a passenger compartment. At least one fastening element is mounted with respect to the body and is at least partially located within the passenger compartment. At least one connector configured to support a vehicle convenience device is releasably securable to the at least one fastening element to enable a vehicle user to modify which convenience devices are mounted within the passenger compartment. In an exemplary embodiment, the at least one fastening element is sufficiently configured such that the at least one connector is releasably securable at multiple locations within the passenger compartment.

The vehicle provided thus enables a vehicle user to customize the presence and location of convenience devices according to the user' preference, and further enables the vehicle user to alter the presence and location of the convenience items as the user' needs and preferences change. For example, a cup holder may be connected to a connector. The connector may be secured to the at least one fastening element at a first location for a first passenger, and then moved to a second location on the at least one fastening element for a second passenger. If a cup holder is not desired, but another item such as a reading light is desired, then another connector having a reading light attached thereto may be secured at either the first or the second location.

A corresponding system for use in a vehicle body is also provided. The system includes an elongated member mountable to the body such that the elongated member is at least partially in the passenger compartment. The system further includes at least one connector that is releasably securable to the elongated member at a plurality of locations along the length of the elongated member to support at least one convenience device.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic side sectional view of another of the fastening elements of FIG. 1 with an alternatively-configured connector secured thereto;

FIG. 4 is a fragmentary schematic perspective view of one of the fastening elements of FIG. 1 with a connector supporting a vase;

FIG. 5 is a fragmentary schematic perspective view of one of the fastening elements of FIG. 1 with a connector supporting an electrical socket;

FIG. 6 is a fragmentary schematic perspective view of one of the fastening elements of FIG. 1 with a connector supporting a fan;

DESCRIPTION OF THE PREFERRED EMBODIMENTS

Figure 1:
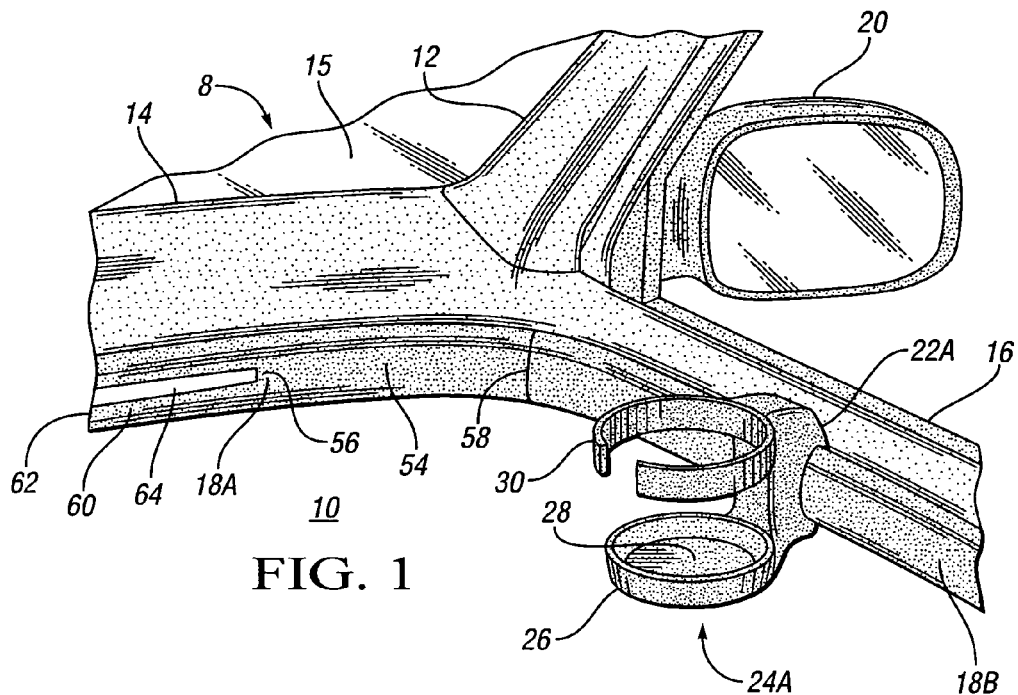
FIG. 1 is a fragmentary schematic perspective view of a vehicle body defining a passenger compartment having fastening elements formed as decorative trim pieces, and a connector supporting a cup holder.

Referring to FIG. 1, a vehicle body 8 defines an interior compartment, and more specifically, a passenger compartment 10. The body 8 includes an A-pillar 12, instrument panel 14, windshield 15, and vehicle door panel 16, which cooperate to at least partially define the interior compartment 10 as understood by those skilled in the art. The vehicle body 8 also includes a plurality of fastening elements 18A, 18B that are mounted with respect to the body 8 and at least partially located within, or partially forming, the passenger compartment 10. In the embodiment depicted, the fastening elements 18A, 18B are decorative trim pieces, with one of the fastening elements 18A being mounted to the instrument panel 14 and one of the fastening elements 18B being mounted to the vehicle door panel 16. Other exemplary locations for fastening elements within the scope of the claimed invention include the back of a passenger seat, a vehicle headliner, etc. For reference purposes, a rear view mirror 20 is shown attached to the vehicle door adjacent the A-pillar 12 on the vehicle body exterior.

A fastener, or connector 22A, is releasably connected to fastening element. 18B. The connector 22A is configured to support a convenience feature 24A, namely, a cup holder that is integrally formed with the connector 22A. The cup holder portion of the connector 22A includes a base member 26 defining an upwardly-open depression 28 for supporting the base of a beverage container such as a cup, can, or bottle (not shown). The cup holder portion of the connector 22A also includes an upper brace 30 configured to restrain the upper portion of the beverage container. The upper brace 30 is preferably selectively adjustable to accommodate beverage containers of various sizes.

Figure 2:
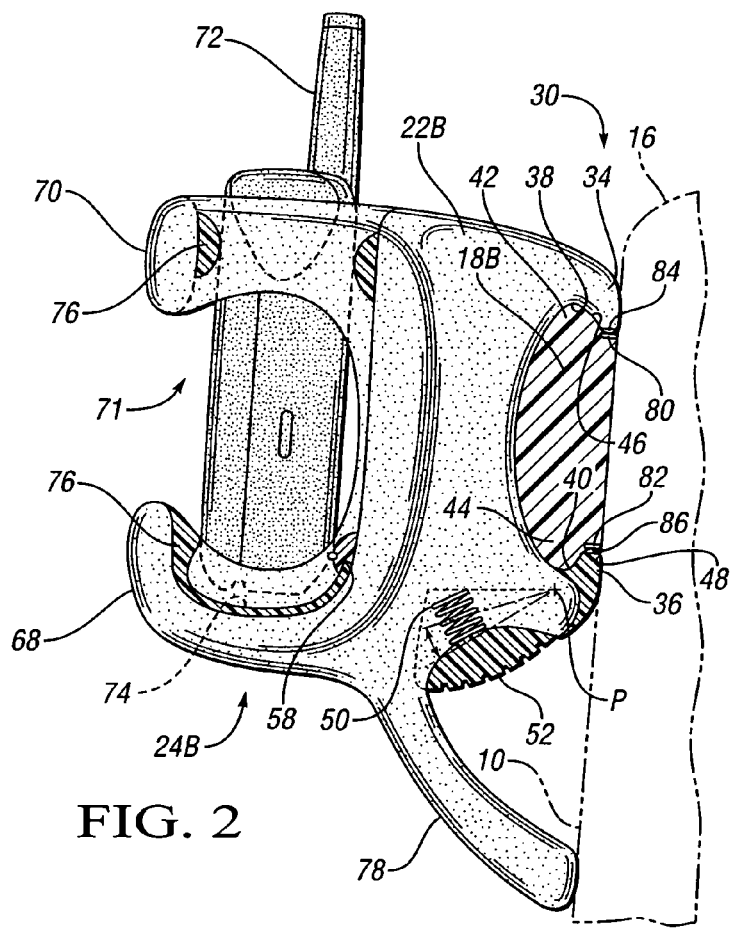
FIG. 2 is a schematic side sectional view of one of the fastening elements of FIG. 1 with a connector secured thereto and supporting an cellular telephone holder.

FIG. 2, wherein like reference numbers refer to like components from FIG. 1, is a schematic, sectional view of a connector 22B attached to one of the fastening elements 18B. Referring to FIG. 2, connector 22B includes an interface 30 at which the connector 22B is engageable with the fastening element 18B. The interface 30 includes an upper hook or protrusion 34 and lower hook or protrusion 36. The lower hook 36 is pivotably mounted with respect to the body of the connector 22B. The upper hook 34 defines a first recess or notch 38, and the lower hook 36 defines a second recess or notch 40.

The fastening element 18B includes an upper shoulder 42 and a lower shoulder 44. The upper shoulder 42 cooperates with the door trim panel 16 to define a notch 46, and the lower shoulder 44 cooperates with the door trim panel 16 to define a notch 48. As shown in FIG. 2, the connector 22B is secured to the fastening element 18B through physical part interference between hook 34 and shoulder 42, and between hook 36 and shoulder 44, when the hooks 34, 36 are within notches 46, 48, respectively, and when shoulders 42, 44 are in notches 38, 40, respectively.

A spring 50 biases the hook 36 in an extended position as shown. To release the connector 22B from the fastening element 18B, the lower hook 36 is rotatable or pivotable about a pivot point P. Applying sufficient pressure to a trigger release portion 52 of the hook 36 will overcome the bias of spring 50, allowing the hook 36 to rotate sufficiently to disengage the shoulder 44 of the fastening element 18B, thereby to release the fastener 22B from the fastening element 18B.

Though in the embodiment shown the connector 22B is securable to the decorative trim piece 18B in a clamping arrangement, persons of ordinary skill in the art will recognize that the connector 22B and fastening element 18B can employ a variety of fastening means within the scope of the claimed invention, including, but not limited to, a snap-on clip, latch, or other coupling arrangement. Furthermore, although the fastening elements 18A, 18B are depicted as protrusions from a door panel or instrument panel, the fastening elements 18A, 18B could define a cavity or recess in which a connector is selectively fittable to releasably secure the connector to the fastening element within the scope of the claimed invention. For example, in the embodiment depicted in FIG. 2, the connector 22B defines a cavity that includes notches 38, 40; within the scope of the claimed invention, the fastening elements 18A, 18B could define a cavity like the one defined by connector 22B, and a connector could include upper and lower shoulders fittable within the notches of the cavity to secure the connector to the fastening element. In such an embodiment, the connector could be secured to the fastening element by inserting the upper and lower shoulders of the connector into the cavity of the fastening element, and then twisting the connector until the shoulder are positioned within the notches. Similarly, the connector could include a cam to engage the notches upon rotation of the connector within the cavity of the fastening element.

Referring to FIGS. 1 and 2, the cross sectional geometry of fastening element 18B along its entire length is substantially identical or substantially similar to the section shown in FIG. 2, permitting the connector 22B to be secured at multiple locations along the length of the fastening element 18B and therefore at multiple locations within the passenger compartment 10 of the vehicle body. In other words, connector 22B is releasably connectable at any location along the length of fastening element 18B. Segment 54 of fastening element 18A, between points 56 and 58, has the same cross-sectional shape as the fastening element 18B shown in FIG. 2, and, accordingly, connector 22B is releasably connectable to the fastening element 18A at any point along the length of segment 54.

FIG. 3, wherein like reference numbers refer to like components from FIGS. 1 and 2, is a schematic, sectional view of fastening element 18A at segment 60, between points 56 and 62. The cross-sectional shape of segment 60 is identical to the cross sectional shape of fastening element 18B shown in FIG. 2, except that segment 60 is characterized by a protrusion 64. The interface 30' of connector 22C is identical to the interface 30 of connector 22B, except that connector 22C has a corresponding cavity 66 that aligns with protrusion 64 to enable the connector 22C to connect to the fastening element 18A anywhere along segment 60. In contrast, physical part interference between connector 22B of FIG. 2 and the protrusion 64 would prevent the attachment of connector 22B anywhere along segment 60, whereas connector 22C is connectable anywhere along the lengths of elements 18A and 18B, including segment 60. Thus, certain connectors may be limited in their attachment locations in the event it is not desirable to affix certain connectors in a particular region of the passenger compartment.

Referring again to FIG. 2, connector 22B supports a convenience device 24B, namely a cellular telephone holder that is integrally formed with the connector 22B. More specifically, the telephone holder includes a base member 68 and upper brace 70. The base member 68 and upper brace 70 define a cavity 71 sufficiently large to hold a cellular phone 72. The base member 68 has a depression 74 suitable to hold the bottom of the cellular phone 72 and the upper brace 70 is cylindrically shaped or otherwise configured to hold or embrace the cellular phone 72. The base member 68 and upper brace 70 may be lined with a foam elastomer 76 to conform to the shape of the cellular phone 72 and prevent the cellular phone 72 from rattling and/or vibrating when the vehicle is in motion.

Connector 22B includes a stabilizer 78, which extends from the body of the connector to abut a portion of the vehicle interior compartment 10, such as door panel 16 or the instrument panel (shown at 14 in FIG. 1). The stabilizer 78 primarily provides vertical support to the connector 22B. Such support may be ideal for connectors supporting heavier convenience devices.

Electrical contacts 80, 82 are mounted to the element 18B in respective notches 46, 48, and are operatively connected to the vehicle's electrical system. Connector 22B includes electrical contacts 84, 86 that are positioned with respect to the connector 22B so that each of electrical contacts 84, 86 contacts a respective one of contacts 80, 82 when the connector 22B is affixed to the element 18B. Accordingly, the vehicle electrical system can supply electrical energy to the device 24B through the electrical contacts, to charge the telephone 72, for example.

Multiple connectors are available in an inventory to a vehicle user for fastening to the fastening elements 18A, 18B. Each of the multiple connectors has a different device or functionality. Thus, the inventory of fasteners provides a vehicle user with connectors having different functions, and which may be selectively attached at multiple locations within the passenger compartment on the fastening elements 18A, 18B.

Referring to FIG. 4, wherein like reference numbers refer to like components from FIGS. 1-3, connector 22D includes convenience device 24D, namely a bud vase 88. The bud vase 88 is ideal for a single stem flower 90 or small seedlings. Water can be added at the brim 92 of the bud vase 88.

Referring to FIG. 5, wherein like reference numbers refer to like components from FIGS. 1-4, connector 22E includes convenience device 24E, namely a portable power supply 94. The power supply 94 is a socket for providing 12-volt direct current similar to the arrangements popularly embedded in the instrument panels of contemporary vehicle interiors. The power supply 94 can alternatively be fitted with a cigarette lighter. Moreover, the power supply 94 is pivotably secured to the fastener 22E to rotate downward into a stowed position. A lid 96 is further provided to conceal the power supply 94 when not in use or in the stowed position. In one arrangement, the power supply 94 has an on/off switch 98. Connector 22E includes electrical contacts as shown at 84 and 86 in FIG. 2, to supply electrical energy to the socket.

Referring to FIG. 6, wherein like reference numbers refer to like components from FIGS. 1-5, connector 22F supports a convenience device 24F, namely a small fan 100 that is integrally connected to the connector 22F. An on/off switch 110 and power adjuster 112 are provided to vary fan speeds. The fan 100 is pivotably mounted to the connector 22F at 114 and attached thereto by a series of mechanical links, 116 and 118, so that the fan 100 is properly adjustable. The fan 100 further includes a handle 120 on the face 122 of the fan 100 for adjustments. Connector 22F also includes electrical contacts as shown at 84 and 86 in FIG. 2 to supply electrical energy to the motor of the fan.

It should be noted that the connectors 22A, 22D, 22E, 22F are configured with interfaces substantially identical to one of the connectors 22B, 22C to enable their connection to elements 18A, 18B. Those skilled in the art will recognize other convenience devices that may be supported by connectors within the scope of the claimed invention, such as tissue box holders, reading lights, vehicle controls, portable audio systems, clips, etc. It may be desirable for a convenience device to be supported by multiple connectors depending on the size and mass of the convenience device.

Figure 7:
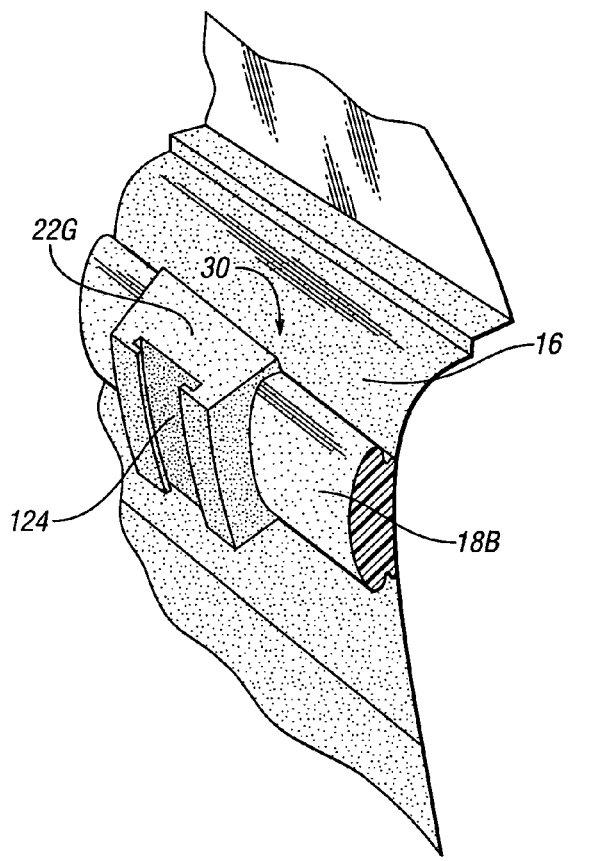
FIG. 7 is an alternative connector characterized by a slot for attaching a convenience device to the connector.

Referring to FIG. 7, wherein like reference numbers refer to like components from FIGS. 1-6, an alternative connector 22G is schematically depicted connected to fastening element 18B. Connector 22G includes an interface substantially identical to one of the connectors 22B and 22C shown in FIGS. 2 and 3 to enable attachment to of the connector 22G to the fastening elements 18A, 18B. Connector 22G differs from the other connectors shown in FIGS. 1-6 in that a convenience device is not integrally formed or connected to the connector 22G. Rather, connector 22G defines a fastening feature, such as a slot 124, at which multiple convenience devices are releasably connectable.

Figure 8:
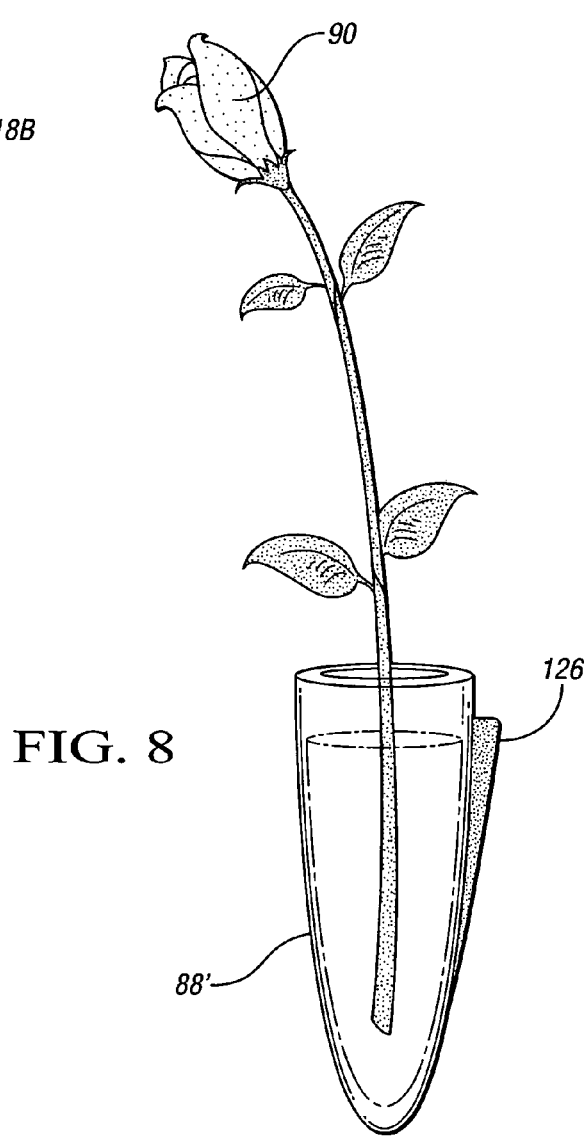
FIG. 8 is a vase having a flange fittable within the slot of the connector of FIG. 7 to releasably connect the vase to the connector.

For example, and with reference to FIG. 8, bud vase 88' includes a flange 126 or other geometric feature fittable within the slot 124 to retain the vase 88' to the connector 22G. If a convenience device connectable to connector 22G requires electrical power for normal operation, such as a fan or reading light, then it may be desirable for the convenience device to be powered with a battery integral to the convenience device rather than through electrical contacts in the connector 22G.

The embodiments of FIGS. 7 and 8 enable the convenience devices to be used across multiple vehicle models having differently-shaped or configured fastening elements 18A, 18B. For example, if a particular vehicle model includes fastening elements that are not compatible with the connector 22G, then another connector that is compatible with the fastening elements may be employed with a slot as shown at 124 in FIG. 7 to enable the vase 88' to be employed in the particular vehicle model.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body defining a passenger compartment;
at least one fastening element being mounted with respect to the body and at least partially located within the passenger compartment; and
at least one connector being releasably connectable to said at least one fastening element, said at least one connector being configured to support a convenience device;
wherein said at least one connector includes a first connector and a second connector; and wherein said at least one body fastening element is sufficiently configured such that the first connector is connectable to said at least one body fastening element at first and second locations, and the second connector is connectable to said at least one body fastening element at the first location and not at the second location.

2. The vehicle of claim 1, further comprising a first electrical contact being mounted with respect to the vehicle body, and a second electrical contact being mounted with respect to the connector; and wherein said first electrical contact and said second electrical contact are sufficiently positioned such that said first electrical contact contacts said second electrical contact when the connector is connected to said at least one fastening element.

3. The vehicle of claim 1, wherein said at least one fastening element includes an elongated member, and wherein said at least one connector is releasably connectable to the elongated member at multiple locations along the length of the elongated member.

4. The vehicle of claim 1, further comprising an instrument panel and a door panel; and wherein said at least one fastening element is mounted with respect to one of the instrument panel and the door panel.

5. A system for providing flexibility in the securing of items in the passenger compartment of a vehicle body, the system comprising:
an elongated member mountable to the body such that the elongated member is at least partially in the passenger compartment; and
at least one connector being releasably connectable to the elongated member at a plurality of locations along the length of the elongated member and being configured to support at least one convenience device;
wherein said at least one connector includes a first connector and a second Connector; and wherein the elongated member is sufficiently configured such that the first connector is connectable to the elongated member at first and second locations, and the second connector is connectable to the elongated member at the first location and not at the second location.

6. The system of claim 5, wherein said elongated member includes a first electrical contact; wherein said at least one connector includes a second electrical contact; and wherein said first electrical contact is positioned on the elongated member and the second electrical contact is positioned with respect to the connector such that the first and second electrical contacts contact one another when said at least one connector is releasably connected to the elongated member.

7. The system of claim 5, wherein the first connector has a first device operatively connected thereto; and wherein the second connector has a second device operatively connected thereto.

8. The system of claim 5, wherein said at least one connector includes a fastening element selectively, releasably connectable to a device.

9. A system for providing flexibility in the securing of items in the passenger compartment of a vehicle body, the system comprising:
an elongated member mountable to the body such that the elongated member is at least partially in the passenger compartment, said elongated member including an upper shoulder at least partially defining a first notch and a lower shoulder at least partially defining a second notch; and a connector including an upper hook at least partially defining a third notch and a lower hook at least partially defining a fourth notch, said lower hook being selectively pivotable with respect to the connector;

wherein said connector is releasably connectable to the elongated member at multiple locations along the length of the elongated member by engaging the upper hook in the first notch, the upper shoulder in the third notch, the lower hook in the second notch, and the lower shoulder in the fourth notch.

* * * * *